(12) United States Patent
Bechmann et al.

(10) Patent No.: US 6,290,041 B1
(45) Date of Patent: Sep. 18, 2001

(54) HUB ARRANGEMENT FOR A HYDRODYNAMIC TORQUE CONVERTER AND METHOD FOR PRODUCING SAME

(75) Inventors: Dietrich Bechmann, Röthlein; Thomas Hegel, Schweinfurt; Günter Wohner, Oerlenbach; André Meyer, Schweinfurt; Roland Illig, Heustreu, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/488,083

(22) Filed: Jan. 20, 2000

(30) Foreign Application Priority Data

Jan. 21, 1999 (DE) .............................................. 199 02 190

(51) Int. Cl.7 .................................................... F16H 45/02
(52) U.S. Cl. ......................................... 192/3.29; 29/889.5
(58) Field of Search ................................ 192/3.28, 3.29, 192/70.16; 29/889.2, 889.21, 889.22, 889.5

(56) References Cited

U.S. PATENT DOCUMENTS

| | | | |
|---|---|---|---|
| 4,576,260 | * 3/1986 | Koshimo | 192/3.29 X |
| 5,080,215 | * 1/1992 | Forster et al. | 192/3.29 |
| 5,477,950 | * 12/1995 | Maloof | 192/3.29 |
| 5,669,474 | * 9/1997 | Dehrmann et al. | 192/3.29 |
| 5,737,836 | * 4/1998 | Finn et al. | 29/889.5 |
| 5,964,329 | * 10/1999 | Kawaguchi et al. | 192/3.3 |
| 6,016,894 | * 1/2000 | Kundermann | 192/3.3 |

FOREIGN PATENT DOCUMENTS 44 23 640  6/1995 (DE) .............................. F16H/45/02

* cited by examiner

*Primary Examiner*—Rodney H Bonck
(74) *Attorney, Agent, or Firm*—Cohen, Pontani, Lieberman Pavane

(57) ABSTRACT

A hub arrangement for a hydrodynamic torque converter includes a first hub component forming a first hub area with a first connection area connectable with a converter housing of the torque converter, a second hub component forming a second hub area with a second connection area connectable with a lockup clutch of the torque converter, and a fluid channel arrangement having at least one fluid channel connecting a radial inner area of the hub arrangement with a radial outer area. The first hub component and the second hub component contact one another at least in some areas in surface regions thereof which are located opposite one another. A recess arrangement is arranged in at least one of the oppositely located surface regions of the first and second hub components for forming the fluid channel arrangement.

18 Claims, 3 Drawing Sheets

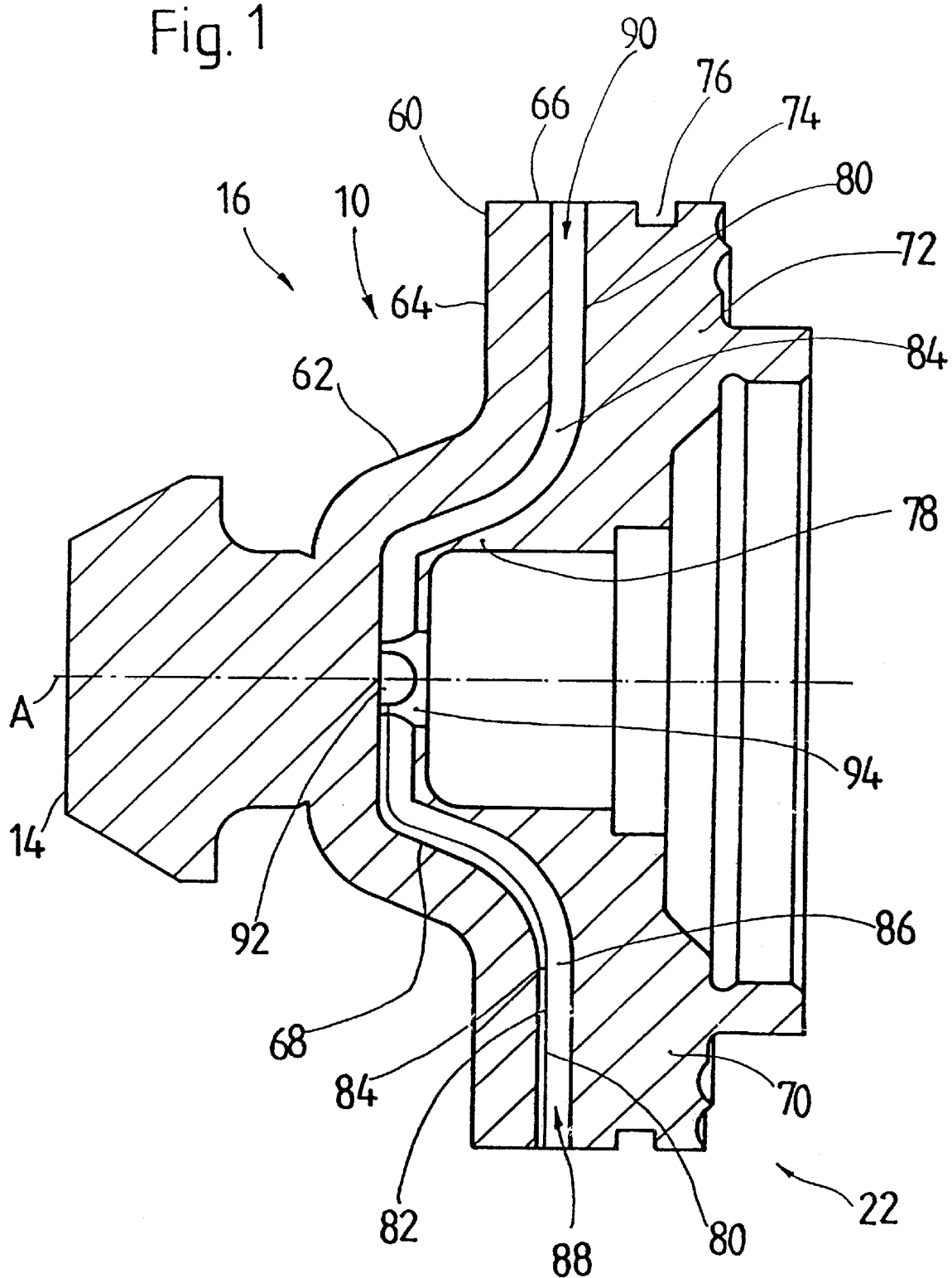

HUB ARRANGEMENT FOR A HYDRODYNAMIC TORQUE CONVERTER AND METHOD FOR PRODUCING SAME

BACKGROUND OF THE INVENTION

1. Field of the Invention

The present invention is directed to a hub arrangement for a hydrodynamic torque converter including a first hub area with a first connection area for connecting with a converter housing, a second hub area with a second connection area for connecting with a component of a lockup clutch of the torque converter, and a fluid channel arrangement with at least one fluid channel which connects a radial inner area of the hub arrangement with a radial outer area of the hub arrangement and which opens outward in the radial outer area in the direction of a hub rotational axis between the first hub area and the second hub area.

2. Description of the Related Art

A hub arrangement having a first hub area and a second hub area with a fluid channel arrangement connecting a radial inner area to a radial outer area of the hub arrangement is known, for example, from German Reference DE 44 23 640 A1. FIG. 3 of the present application shows a torque converter provided with the known hub arrangement. The known hub arrangement 10' in the above reference comprises a hub component 12' with a bearing pin 14' connected integrally therewith, a first connection area 16' to which a housing cover 18' of a converter housing 20' is welded, and a second connection area 22' to which a carrier component 24' for a clutch piston 26' of a lockup clutch 28' is secured. The clutch piston 26' extends axially in its radial inner area and rests on an outer surface of the second connection area 22' with the intermediary of a sealing ring 30'. Further, a fluid channel arrangement with a plurality of fluid channels extending substantially radially, but at a slight inclination, is formed in the hub component 12'. The fluid channels 32' produce a fluid connection between a fluid chamber 34' formed between the converter housing cover 18' and the clutch piston 26' and—via the different shafts which are shown in the Figure and which are constructed as hollow shafts and especially also the transmission input shaft 40' constructed as a hollow shaft—a fluid source or fluid reservoir. The radial outer side of the space 34' communicates with a space 38' via depressions or grooves formed in friction facings at a clutch plate 42'. The space 38' is substantially enclosed by the piston 26' and an impeller shell 36' of the converter housing 20'. For the sake of completeness, it is noted that the different impeller wheel blades 44', a turbine wheel 46' with a turbine wheel hub 48', and a stator wheel 50', are arranged in the space 38'. The space 38' may also be connected, as desired, with the fluid source or the fluid reservoir via an intermediate space 54' formed between the transmission input shaft 40' and a supporting shaft 52' of the stator wheel 50'. Depending on the chamber (chamber 34' or space 38') into which the fluid is introduced, the fluid pressure will be increased in that chamber in relation to the other chamber and the clutch piston 26' will accordingly be moved either toward the housing cover 18', and therefore in a direction in which the clutch plate 42' is clamped, or in the opposite direction.

In this known torque converter, the hub arrangement 10', as was already mentioned, is formed of one part and is constructed in its different surface regions with configurations for supporting bearings and seal components, for example, of the clutch piston or housing cover. The fluid channels 32' are relatively difficult to produce, which results in complicated and cost-intensive production processes. This is partially caused by the inclined position of the channels. The inclined position of these fluid channels is required to ensure the shown constructional form of the hub arrangement in that the inner openings of the fluid channels in the hub arrangement lie very close to the axis of rotation. This arrangement prevents turbulence induced by the rotating movement to a great extent in the fluid flowing radially inward through the channels in the area of the radial inner openings. Accordingly, it is not possible to construct these fluid channels such that they extend substantially radially, namely, in the area of the hub arrangement formed by approximately annular walls.

SUMMARY OF THE INVENTION

It is the object of the present invention to provide a hub arrangement for a hydrodynamic torque converter and a process for producing the hub that overcomes the problems of the prior art.

The object is met according to a first embodiment of the present invention by a hub arrangement for a hydrodynamic torque converter comprising a first hub area with a first connection area connectable with a converter housing, a second hub area with a second connection area connectable with a component of a lockup clutch of the torque converter, and a fluid channel arrangement with at least one fluid channel which connects a radial inner area of the hub arrangement with a radial outer area and which opens outward in the radial outer area axially between the first hub area and the second hub area.

The hub arrangement according to the first embodiment of the present invention has a first hub component which forms the first hub area with the first connection area and a second hub component which forms the second hub area with the second connection area, wherein the first hub component and the second hub component contact one another at least in some areas in surface regions thereof which are located opposite one another.

The hub arrangement further comprises a recess arrangement in at least one of the oppositely located surface regions of the first and second hub component for forming the fluid channel arrangement.

Because the hub arrangement is made of two parts, it is possible to prepare the fluid channel arrangement in a simple manner in that the recess arrangement is provided during the manufacture of the individual hub components. The fluid channel arrangement is then finally completed when the hub arrangement is assembled by the two hub components resting against one another. According to this embodiment of the present invention, no drilling processes or other work processes are required subsequent to the assembly of the hub arrangement to generate the different fluid channels or fluid channel arrangement in the hub component.

The hub arrangement according to the present invention may be produced in a particularly simple manner when a recess arrangement is formed only at one of the surface regions located opposite one another. In this embodiment, the first and the second hub components are structural component parts which are essentially symmetric with respect to rotation. Therefore, there is no need to ensure that the two hub components are in a predetermined rotational position relative to one another when connecting them.

In a further embodiment in which the at least one fluid channel of the fluid channel arrangement has a large width, mutually complementary recess arrangements are provided at both of the oppositely located surface regions. In this embodiment, however, it must be ensured when the two hub components are placed against one another that they are in a relative rotational position in which recesses that are allocated to one another at the two respective components are exactly aligned with one another and/or overlap one another.

The first hub component may have at least one fluid passage opening which is open toward the fluid channel arrangement in a radial inner area of the first hub component.

Further, the second hub component may have a substantially radially extending flange-like area located across from a substantially flange-like area of the first hub component. Furthermore, the first hub component may have a cup-shaped recess in its radial inner area in which a fitting projection of the second hub component constructed in a complementary manner engages.

The fitting projection on the second hub component may be formed, for example, by a fitting element which is connected with the flange-like region of the second hub component.

In this embodiment, it is particularly advantageous for technical reasons relating to manufacture when a recess arrangement is formed only in the first hub component in the region of the cup-shaped recess. Therefore, the fitting projection or the fitting element does not require a recess arrangement.

The first and second hub components may, for example, be produced by a sintering process or by a casting process.

Furthermore, the first and the second hub components may, for example, be connected with one another by laser welding or gluing.

According to another embodiment, the fluid channel arrangement is provided so as to extend substantially radially in a hub component forming the first and second hub areas. The radial inner area of the at least one fluid channel which extends substantially radially opens into a substantially cup-shaped recess and a substantially axially extending groove-shaped recess assigned to each fluid channel is provided in the area of the cup-shaped recess.

Furthermore, a fitting element is inserted into the cup-shaped recess and closes the axially-extending groove-shaped recess on the radial inner side in some regions.

In this way, a channel configuration is achieved in which a first channel area extends substantially radially, i.e., the substantially radially extending fluid channel area provided in the component, and a second channel area which adjoins each substantially radially extending fluid channel and which extends approximately axially. Accordingly, the arrangement of inclined channel areas according to the prior art, which can only be incorporated with difficulty, are not required and may be omitted. The channel configuration including the first channel area that extends radially and the second channel area that extends axially is arranged to ensure that the different fluid channels open only relatively close to the axis of rotation in their radial inner region, so that fluid turbulence can be extensively prevented in this fluid area.

In a hub arrangement constructed according to this embodiment, the fitting element may have a fluid through-opening in its radial inner area.

Furthermore, production of the hub arrangement is simplified in that the fitting element is press fit into the cup-shaped recess of the hub component.

The present invention is further directed to a process for producing a hub arrangement for a hydrodynamic torque converter comprising the steps (a) providing a first hub component with a first connection area connectable with a converter housing, (b) providing a second hub component with a second connection area connectable with a component of a lockup clutch of the torque converter, (c) providing a groove-shaped recess arrangement in a surface region of either the first or second hub component, wherein the surface region is provided for mutual contact against a corresponding surface region of the other of the first or second hub component, (d) arranging the first and second hub component so that the surface regions abut, and (e) connecting the two hub components after they are arranged as in step (d).

The hub arrangement produced according to the above process does not require inclined bore holes that are difficult to produce. Therefore, this complicated step of producing inclines bore holes may be eliminated.

Step (a) and step (b) may comprise production of the respective hub components by a sintering process or by a casting process.

Step (e) may, for example, comprise connection of the two hub components by laser welding or gluing.

According to another embodiment, the present invention is directed to a method for producing a hub arrangement for a torque converter comprising the steps (a) providing a hub component having a first connection area connectable with a converter housing and a second connection area connectable with a component of a lockup clutch of the torque converter, (b) providing at least one fluid channel in the hub component, which fluid channel is open on the radial outside of the hub component axially between the first and second connection areas and opens on the radial inner side of the hub component into a cup-shaped recess of the hub component, (c) providing a groove-shaped recess at an inner surface of the cup-shaped recess, before or after performing step (b), the groove-shaped recess adjoining the at least one substantially radially extending fluid channel, and (d) arranging a fitting element in the cup-shaped recess for closing in some areas the groove-shaped recess on the radial inner side so that the groove-shaped recess and the fitting element forming an axially extending channel.

Also, as a result of a procedure of the type mentioned above, the arrangement of inclined bore holes in a finished structural component part of the hub is dispensed with. However, the radial inner opening of every fluid channel and the radial outer opening of every fluid channel are axially offset with respect to one another in the embodiment according to the present invention.

Step (a) may comprise the steps of, for example, producing a forging blank, providing the at least one fluid channel and the groove-shaped recess adjoining the latter, and turning the forging blank to provide its final shape.

Step (d) may, for example, comprise press-fitting the fitting element into the cup-shaped recess.

Instead of steps (c) and (d), the process may alternatively include step (c') providing a groove-shaped recess associated with the at least one substantially radially extending fluid channel at an outer surface of a fitting element that is insertable into the cup-shaped recess and step (d') arranging the fitting element in the cup-shaped recess so that the groove-shaped recess in the fitting element adjoins the at least one substantially radially extending fluid channel.

In this procedure, when providing groove-shaped recesses on the fitting element in the area of the cup-shaped recess, the hub component itself is not required to have groove-shaped recesses. This is especially advantageous when the hub component is produced by a forging process.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 is a longitudinal sectional view of a first embodiment form of a hub arrangement according to the present invention;

DETAILED DESCRIPTION OF THE PRESENTLY PREFERRED EMBODIMENTS

Figure 2A:
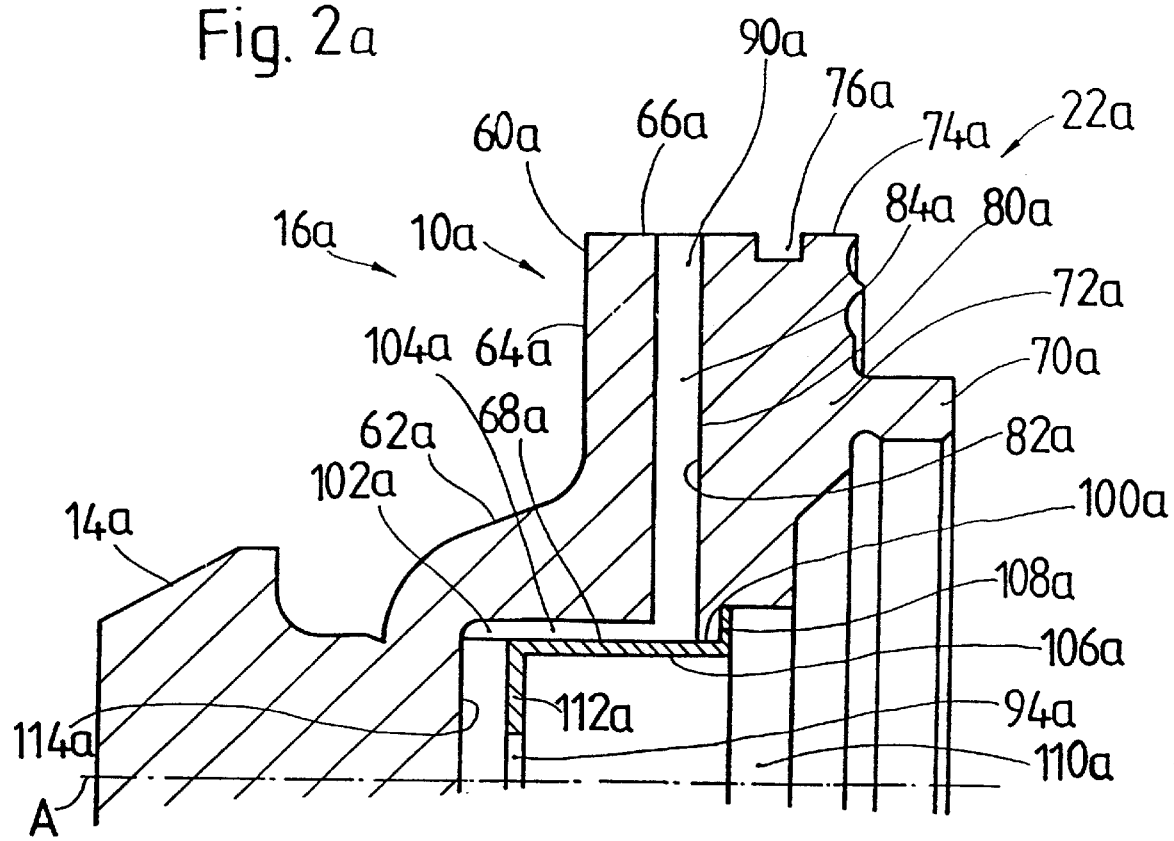
FIG. 2a is a longitudinal sectional view showing the upper half of another embodiment of a hub component according to the present invention.
Figure 2B:
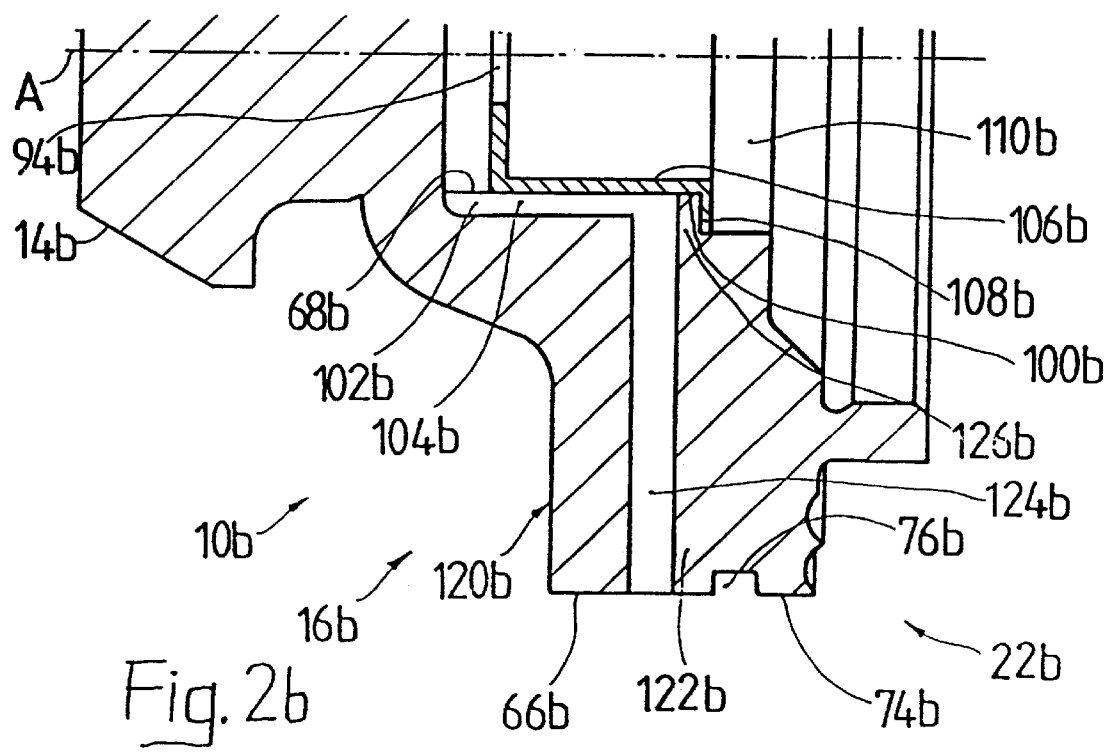
FIG. 2b is a longitudinal sectional view showing the lower half of yet another embodiment of the hub component according to the present invention.
Figure 3:
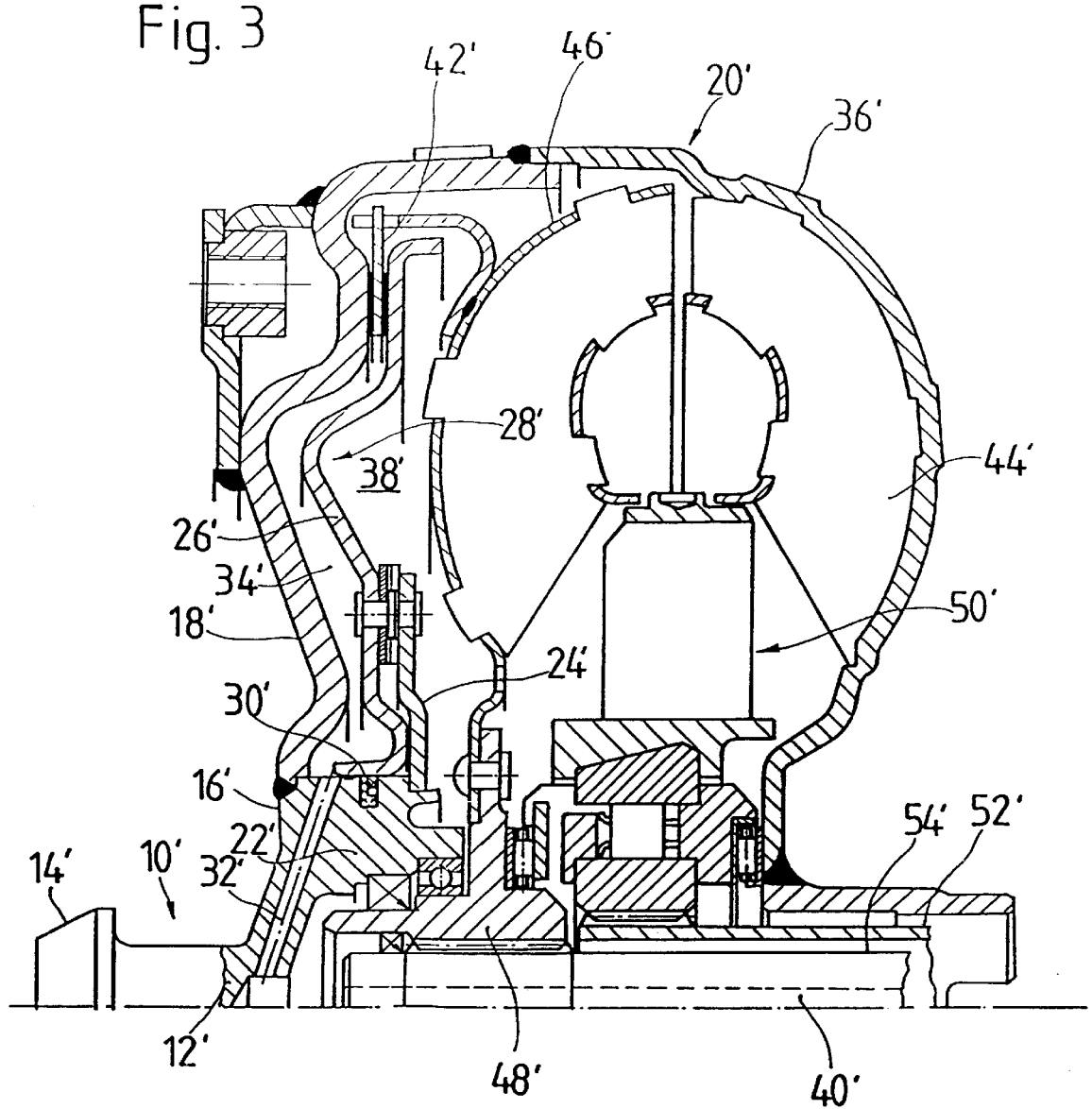
FIG. 3 is a sectional view of a hydrodynamic torque converter according to the prior art.

The basic construction of a hydrodynamic torque converter with its essential functional components comprising a converter housing, a turbine wheel with turbine wheel blades, an impeller wheel with impeller wheel blades, a stator wheel and a lockup clutch, is discussed above in the background section with reference to FIG. 3. This Figure shows all of these components whose functions are known to the person skilled in the art. A hub arrangement according to the invention as is described in the following with reference to FIGS. 1 and 2 may be used, for example, in a torque converter of this type. However, it is noted that the hub arrangement according to the invention may also be used in torque converters which are constructed differently, e.g., having differently constructed lockup clutch, stator wheel, turbine wheel or bearing arrangements.

FIG. 1 shows a first embodiment form of a hub arrangement 10 according to the present invention. The hub arrangement 10 has a first hub component 60 which carries a bearing pin 14 in its central area. The first hub component 60 also comprises a first portion 62 that radially adjoins the bearing pin 14. This first portion 62 of the first hub component 60 extends substantially axially but also slightly radially. The first hub component 60 also comprises a second portion 64 which is a flange-like area that extends substantially radially. As shown in FIG. 3, the radial outer area of the first hub component 60 forms a first connection area 66 for connection such, for example, as via welding, with the converter housing, not shown in FIG. 1, i.e., housing cover of the torque converter. The first portion 62 of the first hub component 60 also forms a cup-shaped recess 68.

The hub arrangement 10 further comprises a second hub component 70 which has, corresponding to the second portion 64 of the first hub component 60, a radial outer flange-like area 72 which has a second connection area 74 arranged on the radial outer side for connecting the hub to a piston of a lockup clutch (also not shown in FIG. 1) of the torque converter. An annular groove 76 in which an annular seal (see FIG. 3) is insertable is provided in an outer circumferential surface. A fitting portion 78 is arranged on the radial inner side of the second converter component 70 that is shaped to complement the first portion 62 of the first hub component 60 and the cup-shaped recess 68 formed therein. In the assembled state, the first hub component 60 and the second hub component 70 contact one another along respective surface regions 80, 82. Accordingly, in this assembled state, the first hub component 70 forms a first hub area 16 and the second hub component 70 forms a second hub area 22.

The lower part of FIG. 1 shows that groove-shaped recesses 84, 86 are formed, respectively, in the surface regions 80, 82 that are located opposite one another and that can be or are brought into contact with one another. These groove-shaped recesses 84, 86 are located opposite one another when the surface regions 80, 82 contact one another and therefore form fluid channel 88. The fluid channel 88 together with another fluid channel 92 which extends away toward the rear and which is only discernable by its opening form a fluid channel arrangement.

Because the hub arrangement 10 according to the present invention is produced from first and second hub components 60, 70 with groove-shaped recesses 84, 86 respectively provided in the surface regions 80, 82 of the first and second hub components 60, 70, different fluid channels may be generated in a simple manner and may then be connected with a fluid source or a fluid reservoir (neither of which is shown in FIG. 1) via a central opening 94 in the fitting portion 78 of the second hub component 70. The arrangement eliminates the requirement to perform any drilling processes to generate this fluid channel 88, yet a configuration can be achieved in which the fluid channel 88 extends almost completely up to the axis of rotation A and wherein the radial inner and radial outer area of these channels are offset axially relative to one another, so that, particularly in the area of the inner surface of the second hub component 70, sufficient installation space can be made available for supporting the different converter shafts, i.e., the transmission input shaft and, as can be seen in FIG. 3, the turbine wheel hub at the second hub component 70 via respective bearing and sealing arrangements (shown in FIG. 3).

The first and second hub components 60, 70 of the hub arrangement 10 in FIG. 1 may, for example, be produced as separate parts. For this purpose, the first and second hub components 60, 70 may be produced in their final form by a sintering process or, for example, they may be produced by casting and then turned and provided with the groove-shaped recesses. The first and second hub components 60, 70 are then placed against one another by their surface regions 80, 82 and fixedly connected with one another, for example, by laser welding or welding in the areas in which no groove-shaped recesses are formed. In this regard, the cup-shaped recess 68 and fitting portion 78 produce an exact centering of the two hub components 60, 70 relative to one another so that the second connection area 74 is exactly centered with respect to the bearing pin 14 and with respect to the first connection area 66. When the first and second hub components 60, 70 are produced by sintering, it is necessary to produce a bearing pin 14 as a separate structural component part that is welded to the first hub component 60. When the first and second hub components 60, 70 are produced as turned parts or forging parts, the first hub component 60 may be formed as an integral part with the bearing pin 14.

In this embodiment, the groove-shaped recesses 84, 86 may be positioned so that they are offset relative to one another in the circumferential direction when joining the first and second converter components 60, 70. In this position, the total cross-sectional surface of the fluid channel arrangement remains the same, but a more uniform cooling effect is achieved over the contacting surface regions 80, 82.

The groove-shaped recesses 84 or 86 may optionally be provided in only one of the surface regions 80, 82. This is shown in the upper half of FIG. 1 in that fluid channel 90 is formed essentially completely in the first hub component 60 and is closed toward by the surface region 80 of the second hub component 70. In this embodiment, there is not need to position the first and second hub components 60, 70 in a determined rotational position relative to one another. The groove-shaped recess may alternatively be provided in the second hub component 70 and closed by the surface region 82 of the first hub component 60.

Different alternative embodiment forms of a hub arrangement according to the invention are shown in FIGS. 2a and 2b. The configuration shown FIG. 2a will be described first, wherein components corresponding to the components described above are designated by the same reference numbers with the addition of a suffix "a".

Another embodiment of a hub arrangement 10a is shown in FIG. 2a in which a second hub part 70a is constructed such that it has no recesses at its surface region 82a and has an enlarged opening 100a in its radial inner area instead of the fitting portion of the embodiment according to FIG. 1. A first hub part 60a is constructed such that a groove-shaped recesses 84a forming the fluid channel 90a is formed in its surface region 80a. When the first and second hub components 60a, 70a are placed against one another, the channel 90a is closed by the surface region 82a of the second hub component 70a. In the area of a cup-shaped recess 68a of the first hub component 60a, a groove-shaped and substantially axially extending recess 102a is provided so that the recess 102a adjoins the groove-shaped recess 84a. As will be described in the following, the groove-shaped recesses 102a then form substantially axially extending channel portions 104a which, together with the substantially radially extending channel portion or channel 90a, form a through-passage from a radially outer side to a radially inner side of the hub arrangement 10a.

After the first and second hub components 60a, 70a are joined, a sleeve-shaped fitting part 106a is press-fitted into the opening 100a of the second hub component 70a. The sleeve-shaped fitting part 106a is essentially adapted to the inner circumferential dimensioning of the cup-shaped recess 68a, so that the outer surface of the fitting part 106a rests on the inner surface of the cup-shaped recess 68a. The sleeve-shaped fitting part 106a is inserted into the opening 100a until a flange-like fixing edge 108a of the sleeve-shaped fitting part 106a abuts a corresponding recess 110a of the second hub component 70a. The sleeve-shaped fitting part 106a is inserted by press fit, so that no additional fastening steps are required. After the fitting part 106a is inserted, the groove-shaped recesses 102a on the inner radial surface of the first hub component 60a are closed by the fitting part 106a to form channel portions 104a. A base area 112a of the fitting piece 106a is located at a distance from the base 114a of the cup-shaped recess 62a so that the channel portions 104a are only open toward the radial inner side at an axial end of the groove-shaped recesses 102a that is remote from the connection of the groove-shaped recesses 102a to the substantially radially extending channels 90a. In this way, fluid can flow through the opening 94a to the channels 104a, 90a or vice versa.

In this embodiment it is advantageous when both the cup-shaped recess 68a and the fitting piece 106a are constructed essentially cylindrically, so that a secure press fit is achieved without resulting in a tendency of the fitting piece 106a to move axially out of the cup-shaped recess 68a in an unwanted manner.

In the embodiment of FIG. 2a, it is also possible to generate the respective channel portions 90a only at surface regions of the first hub component 60a which is then closed by the surface regions of the second hub component 70a. Furthermore, in the embodiment of FIG. 2a the second component 70a is formed of two parts. It is noted that it is also possible to provide groove-shaped recesses in the surface region 82a of the second component 70a. Furthermore, the totality of groove-shaped recesses 84a may optionally be relocated into the second hub component 70a and then closed by the surface region 80a of the first hub component 60a. In this optional embodiment, when joining the two hub components 60a, 70a, the groove-shaped recesses 102a on the first hub component 60a would have to be aligned with the groove-shaped recesses at the second hub component 70a.

FIG. 2b shows an embodiment form in which components corresponding to components described above are designated by reference numbers with appended "b".

The hub arrangement 10b in FIG. 2b comprises a one-part hub component 120b which again has, in its central area, a cup-shaped recess 68b with groove-shaped recesses 104b. However, the cup-shaped recess 68b has, in its flange-like area 122b, a plurality of substantially radially extending openings or bore holes 124b. As the fluid channels 88, 90, 90a in the preceding embodiments, the bore holes 124b can be arranged so as to be distributed in the circumferential direction, preferably equidistant from one another.

Also, in this embodiment form, by fitting the fitting piece 106b through the opening 100b and the axially directed groove-shaped recesses 102b, axial channel portions 104b are formed. A channel configuration may be provided in which the opening of the channels 124b located on the radial outer side and the opening of the channel portions 104b located on the radial inner side are offset axially relative to one another to provide sufficient installation space for the above-mentioned shafts which are to be supported in the hub arrangement, while nevertheless ensuring that the channels extend as close as possible to the axis of rotation A.

The substantially axially extending groove-shaped recesses 102b may be introduced by forging, for example, or they can be produced after the forging process by axial broaching.

The embodiment form of the hub arrangement 10b may, for example, be provided by first producing a forging blank with the channels 124b produced there, e.g., by drilling, and with the groove-shaped recesses 102b machined, for example, by forging or broaching. In this embodiment, the extension of the flange-like area 108b of the fitting piece 106b is preferably greater in the radial direction than in the previous embodiments because the opening 110b is also correspondingly enlarged radially thereby allowing the groove-shaped recess 102b to be made by broaching.

After the forging blank has been provided with the different channels or channel portions, it can be finish-machined by turning, so that it is put into a form suitable for use. The fitting piece 106b may then be pressed in, as was described above, to close, in the radial inner direction, the groove-shaped recesses 102b for forming the channel portions 104b.

The embodiment of FIG. 2b also circumvents the introduction of diagonal bore holes in the hub arrangement 10b while still producing an axial offset between the two opening regions of the channels or channel portions. It is further noted that in the embodiment form shown in FIGS. 2a and 2b, the bearing pins 14a and 14b, respectively, can be constructed as an integral component part of the hub component 60a and 120b, respectively; but it is also possible to arrange it as a separate structural component part by welding.

In the embodiment form according to FIGS. 2a and 2b, a longitudinally extending outer toothing may be incorporated on the fitting piece 106a, 106b. Therefore, the channel 90a, 124b and the outer toothing allow fluid to pass through.

The modular construction of the converter hub according to the present invention and the distortion-free connection of the converter hub to the converter housing such, for example, as by laser welding, it is possible to avoid difficult machining processes required for introducing inclined through-channels and it is possible while carrying out the connection process at the converter housing to avoid inaccuracies in the mutual centering of the different connection areas or bearing areas of the hub arrangement which would have to be eliminated by subsequent turning.

The expressions "radial or substantially radial" and "axial or substantially axial" within the meaning of the present invention are meant to include a slight, but not problematic, deviation from the respective direction as a result of manufacturing. This relates in particular to the radial inner area of the cup-shaped recess, where a recess which widens outward slightly in a conical manner and a fitting piece which is shaped so as to complement the latter may also be provided.

In addition, the piston of the lockup clutch in the torque converter may also have a radial inner area connected with the turbine wheel so that the piston is fixed with respect to rotation relative to the turbine wheel. The piston is then supported directly at the converter housing, i.e., engages at the latter without the intermediary of a clutch plate. In this embodiment, the second connection area 74, 74a, 74b is not used for connecting with the piston or with a component of the lockup clutch. Rather, the second connection area 74, 74a, 74b is a supporting connection for the hub of the turbine wheel and different shafts supported therein. Also, in an embodiment of this kind, a simplified construction and a simpler production process can be achieved by means of the hub component according to he invention.

The invention is not limited by the embodiments described above which are presented as examples only but can be modified in various ways within the scope of protection defined by the appended patent claims.

What is claimed is:

1. A hub arrangement for a hydrodynamic torque converter, comprising:
a first hub component forming a first hub area having a first connection area connectable to a converter housing of the torque converter;
a second hub component forming a second hub area having a second connection area connectable to a component of a lockup clutch of the torque converter; said first and second hub components comprising surface regions, wherein said first and second hub components contact each other on said surface regions; and
a recess arrangement in at least one of said surface regions forming a fluid channel connecting a radial inner area and a radial outer area of said hub arrangement, said fluid channel opening in said radial outer area axially between said first connection area and said second connection area.

2. The hub arrangement of claim 1, wherein said recess arrangement is formed at one of said surface regions of said first and second hub components.

3. The hub arrangement of claim 1, wherein said recess arrangement comprises mutually complementary recess arrangements arranged on surface regions of both said first and second hub components.

4. The hub arrangement of claim 1, further comprising a through-opening for conducting fluid arranged in a radial inner area of said second hub component, wherein said through-opening is open toward and in communication with said fluid channel arrangement.

5. The hub arrangement of claim 1, wherein a radial outer portion of said first hub component comprises a flange-like area and a radial inner portion of said first hub component comprises a cup-shaped recess, a radial outer portion of said second hub component comprises a substantially radially extending flange-like area arranged axially across from said substantially flange-like area of said first hub component, and a radial inner area of said second hub component comprises a fitting projection engaging said cup-shaped recess of said first hub component, wherein an axial extension of said recess arrangement extends axially between said fitting projection and said cup-shaped recess.

6. The hub arrangement of claim 5, wherein said fitting projection comprises a fitting element connected to said substantially radially extending flange-like area of said second hub component.

7. The hub arrangement of claim 5, wherein said axial extension of said recess arrangement is formed only in said surface region in said cup-shaped recess of said first hub component.

8. The hub arrangement of claim 1, wherein said first and second hub component comprise materials formed by one of a sintering process and a casting process.

9. The hub arrangement of claim 1, wherein said first and second hub components are connected via a connection comprising one of a laser weld and glue.

10. A hub arrangement for a hydrodynamic torque converter, comprising:
a hub component forming a first hub area having a first connection area connectable to a converter housing of the torque converter and a second hub area having a second connection area connectable to a component of a lockup clutch of the torque converter, said hub component further comprising a cup-shaped recess in a radial inner area of said hub component, a fluid channel extending radially from said cup-shaped recess to a radial outer area of said hub component, said fluid channel opening at said radial outer area axially between said first connection area and said second connection area, and a groove-shaped recess in said cup-shaped recess associated with said fluid channel; and
a fitting element inserted into said cup-shaped recess and closing said groove-shaped recess.

11. The hub arrangement of claim 10, wherein said fitting element comprises 2 a fluid through-opening in a radial inner area of said fitting element.

12. The hub arrangement of claim 10, wherein said fitting element is pressed into said cup-shaped recess of said hub component.

13. A method for producing a hub arrangement for a hydrodynamic torque converter having a fluid channel arrangement between a radial inner end and a radial outer end of the hub arrangement and axially between a first hub area connectable to a converter housing of the torque converter and a second hub area connectable to a component of a lockup clutch of the torque converter, the method comprising the steps:

(a) forming a first hub component with a first connection area connectable with the converter housing;

(b) forming a second hub component with a second connection area connectable with a component of a lockup clutch or a component of the turbine wheel of the torque converter;

(c) forming a groove-shaped recess arrangement in a surface region of at least one of the first and second hub components, where in the first and second hub components contact each other via the surface regions;

(d) supporting the first and second hub components against one another on the surface regions;

(e) connecting the first and second hub components.

14. The method of claim 13, wherein said steps (a) and (b) comprise forming said first and second hub components via one of a sintering process and a casting process.

15. A method for producing a hub arrangement for a hydrodynamic torque converter having a fluid channel arrangement between a radial inner end and a radial outer end of the hub arrangement and axially between a first hub area connectable to a converter housing of the torque converter and a second hub area connectable to a component of a lockup clutch of the torque converter, the method comprising the steps:

(a) forming a hub component comprising the first hub area and the second hub area;

(b) forming at least one fluid channel in the hub component so that the fluid channel opens on the radial outside axially between the first hub area and the second hub area and so that the fluid channel opens on the radial inner side into a cup-shaped recess of the hub component;

(c) forming a groove-shaped recess on an inner surface of the cup-shaped recess of the hub component so that said groove-shaped recess adjoins the at least one fluid channel before or after said step (b); and (d) arranging a fitting element in the cup-shaped recess for closing a portion of the groove-shaped recess formed in said step (c).

16. The method of claim 15, wherein said step (a) comprises producing a forging blank before performing said steps (b) and (c), and turning the forging blank to produce the final shape of the hub component after said steps (b) and (c).

17. The method of claim 15, wherein said step (d) comprises pressing the fitting element into the cup-shaped recess.

18. A method for producing a hub arrangement for a hydrodynamic torque converter having a fluid channel arrangement between a radial inner end and a radial outer end of the hub arrangement and axially between a first hub area connectable to a converter housing of the torque converter and a second hub area connectable to a component of a lockup clutch of the torque converter, the method comprising the steps:

(a) forming a hub component comprising the first hub area and the second hub area;

(b) forming at least one fluid channel in the hub component so that the fluid channel opens on the radial outside axially between the first hub area and the second hub area and so that the fluid channel opens on the radial inner side into a cup-shaped recess of the hub component;

(c) forming a groove-shaped recess on an outer surface of a fitting element arrangeable in the cup shaped recess of the hub component so that said groove-shaped recess is associated with the at least one fluid channel before or after said step (b);

(d) arranging the fitting element in the cup-shaped recess of the hub component so that the groove-shaped recess adjoins the at least one fluid channel.

* * * * *